Figure 1:
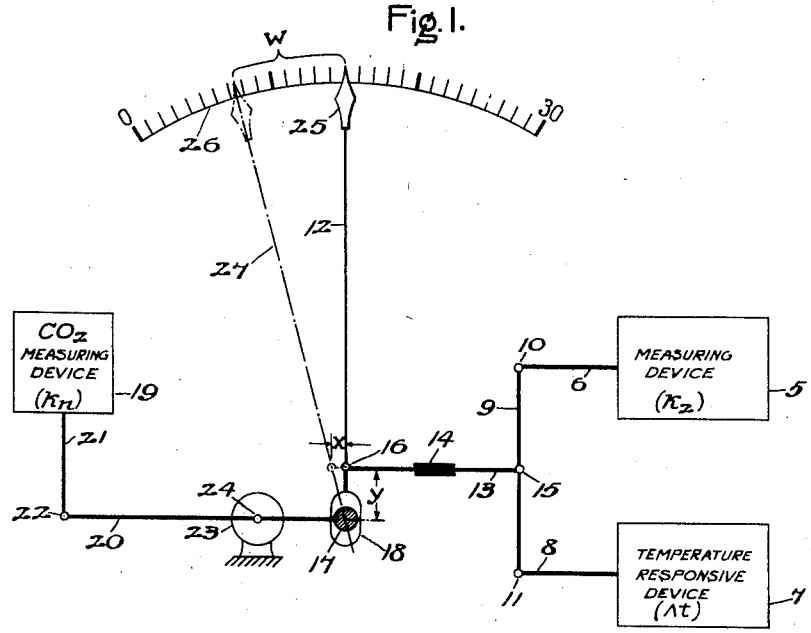

July 6, 1926.

T. STEIN 1,591,444

DEVICE FOR MEASURING FLUE GAS LOSSES

Filed Feb. 10, 1925

Inventor:
Theodor Stein,
by *Alexander S. Lunt*
His Attorney.

Patented July 6, 1926.

1,591,444

UNITED STATES PATENT OFFICE.

THEODOR STEIN, OF BERLIN, GERMANY, ASSIGNOR TO GENERAL ELECTRIC COMPANY, A CORPORATION OF NEW YORK.

DEVICE FOR MEASURING FLUE-GAS LOSSES.

Application filed February 10, 1925, Serial No. 8,216, and in Germany February 28, 1924.

The present invention relates to boiler plants and the like, and more particularly to means for measuring chimney or flue gas losses therein.

The object of the invention is to provide an improved means for more accurately measuring flue gas losses than has heretofore been possible.

The usual determination of the carbonic acid content of flue gases does not give a sufficient indication of the losses incurred by the combustion, especially in the case where the unburned material content is of such magnitude as to represent a considerable portion of the entire flue gas loss. The temperature of the flue gas is another factor to be considered and varies with the quantity of entering air supplied to support combustion which in turn is dependent upon the load, so that for the same $CO_2$ content there corresponds different flue gas losses depending upon the temperature of the flue gas.

This condition has heretofore been met, in obtaining an indication of the flue gas losses, by providing in conjunction with the $CO_2$ measuring device, a thermometer with several superposed scales, each scale being used for a certain $CO_2$ content and permitting the reading of the losses in hundredth parts, for example, in dependency on the temperature, that is, the temperature difference between the flue gas and the entering air. The values obtained are then calculated after the Siegert formula as expressed in the following equation:

$$(1) \quad V = 0.65 \frac{\Lambda t}{k}$$

in which $k$ is the actual $CO_2$ content of the flue gas and $\Lambda t$ the temperature difference between the flue gas and the entering air.

This arrangement has the disadvantage that with the necessarily few thermometer scales, to which the apparatus is limited for practical reasons, only a corresponding number of accurate readings of the $CO_2$ content can be obtained directly. The $CO_2$ content is continually changing and for values not provided for by a scale, the losses must be estimated by interpolation. In doing this the essentially greater accuracy of the $CO_2$ measuring device is lost for these readings. Furthermore, the use of two instruments is complicated and inconvenient and the apparatus which is used to determine the flue gas losses mainly by the Siegert formula does not take into consideration the content in unburned material. With a high content of unburned material the error in the determination of the total flue gas losses must be large.

In accordance with the invention, the latter error is eliminated and the measurement of the $CO_2$ content is made to a positive indication of the air excess by reburning the flue gases before measurement, so that all the carbon present is converted into $CO_2$.

The $CO_2$ content of the reburned gases is then determined in the usual manner by a suitable $CO_2$ meter and this meter, together with another for the flue gas temperature, is arranged to operate a device which directly indicates the flue gas loss, in accordance with the variations transmitted to it by the above-named meters. The necessity of comparing the waste gas loss and the loss by unburned material in determining the total flue gas loss is no longer necessary, and the boiler can thus be operated in accordance with the direct indications of the above-mentioned device.

The use of one device on which the total flue gas or chimney loss can be directly read is especially desirable when recording instruments are used. With the separate recording of the $CO_2$ quantity, of the temperature and of the unburned material content, only the mean values can be determined over a certain time interval and the total flue or chimney loss can then be calculated only very indefinitely from these. With the measuring device of the present invention the mean value of the entire flue gas loss is indicated at once, wherefrom the degree of efficiency of the combustion may be determined. This eliminates the necessity of calculating the efficiency by involved formulæ from the separate indications of the several factors influencing the efficiency and also eliminates the errors introduced in correlating the records of separate instruments indicating these factors.

The Seigert formula does not take into consideration that the cooling loss by the water vapor content in the flue gas is independent of the $CO_2$ content. For this reason, in accordance with the invention, for the expression $\frac{0.65}{k}$, another is substituted in which, according to the kind of fuel or coal used, there is added an expression W, taking into consideration the water vapor content, and in which the $CO_2$ content, after having effected the reburning above mentioned, is substituted as $k_n$ for the content $k$.

Furthermore, there is added to the expression $\Lambda t$ or temperature difference the content $k_2$ in unburned material obtained by space or volumetric analysis for example, so that the following very accurate equation may be substituted for equation (1):

$$(2) \quad V = \left(W + \frac{c_1}{k_n}\right)(\Lambda t + c_2 k_2),$$

in which $c_1$ and $c_2$ represent constants and the other factors are as above explained.

In carrying out the object of the invention, means are provided to operate in accordance with the above formula or equation in such a manner that for varying values of $k_n$, $k_2$ and $\Lambda t$, and assuming a certain value for W depending on the particular flue used, the resulting total loss V may be directly read in any suitable units, for example in per cent. of the total B. t. u.'s per pound of fuel.

The values of $k_n$, $k_2$ and $\Lambda t$ are obtained by any suitable means responsive to changes in these values. Such means are well known and do not concern the present invention, but only the means by which their individual indications are correlated in accordance with the above improved formula or equation, and made to indicate the total flue gas loss directly and without computation.

The invention is herein described and illustrated in the accompanying drawing, in connection with two embodiments thereof, by way of example, and for a further consideration of what is believed to be novel and the invention, attention is now directed to said drawing, description thereof, and the appended claims.

Figure 2:
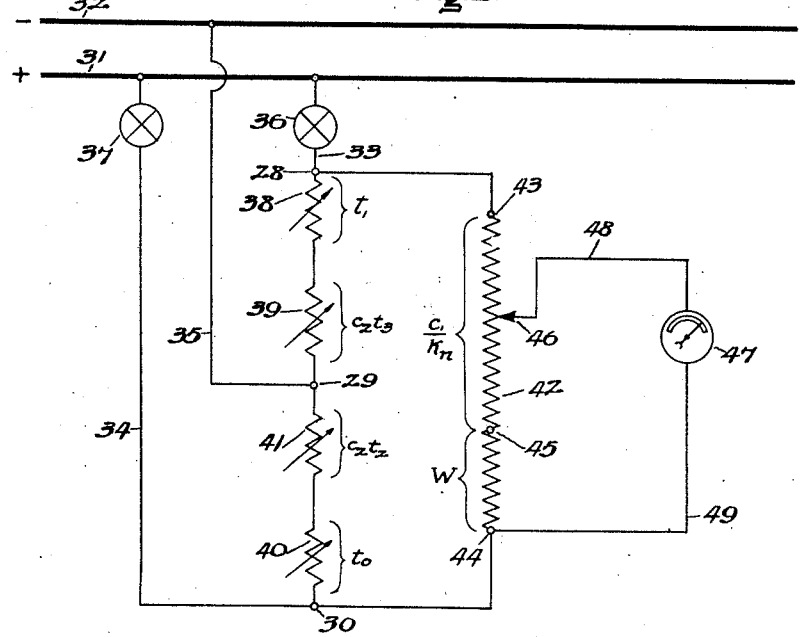

In the drawing, Fig. 1 is a diagrammatical illustration of mechanical means for indicating flue gas losses of equation (2) in accordance with the invention, and Fig. 2 is a similar illustration of a modification, being an electrical means for indicating said flue gas losses.

Referring to Fig. 1, 5 represents any suitable residue measuring device or meter for measuring the value $k_2$, that is, the unburned material remaining in the flue gas after reburning, such as carbon monoxide, for example. The meter is provided with a transmission rod 6 which is moved by it in response to the variations in the quantity of such unburned material, the rod being moved longitudinally to the right, as viewed in the drawing, with an increasing quantity and in the opposite direction for a decreasing quantity.

7 represents any suitable temperature responsive device or meter for measuring the temperature difference $\Lambda t$, between the entering air and the flue gas, and is provided with a transmission rod 8 which is moved in response to said temperature difference in a similar manner to that of rod 6. The two rods 6 and 8 are each pivotally connected in spaced relation to each other with a floating lever 9, as indicated at 10 and 11 respectively, whereby said lever is moved in response to their joint movement.

The movement of the lever 9 is transmitted to a moving vane 12 of a flue gas loss indicator by a connecting rod 13 which is constrained to straight-line movement longitudinally (horizontally in the drawing) by a suitable bearing 14. The rod 13 is pivotally connected at one end with the lever 9 at a point between the pivots 10 and 11, as indicated at 15, and at the other end between the ends of the vane 12 by a pivotal connection or fulcrum 16. By this arrangement the deflection of the fulcrum 16 always corresponds to the sum of the two separate deflections of the rods 6 and 8 of meters 5 and 7 respectively, that is, to the values $\Lambda t + c_2 k_2$ of the equation hereinbefore given, the constant $c_2$ being taken into consideration by locating the pivot 15 at a suitable point along the lever 9.

The vane 12 moves in response to movement of the fulcrum 16, as above explained, about a pivot pin 17 which lies in a link 18 at the lower end of the pointer. The pin is freely movable in the link toward and away from the fulcrum 16, thus providing a movable pivot means on which the vane swings. Through this movable pivot the indications of a $CO_2$ meter 19 are applied to the vane 12 so that its movement is further influenced by the factor $\frac{c_1}{k_n}$, the $CO_2$ meter providing the factor $k_n$ and the constant $c_1$ being introduced by the proper arrangement of the connecting means.

In the present example the connecting means includes the movable pivot arrangement above mentioned, a lever 20 which is connected at one end with the pin 17, and a transmission rod 21 which is pivotally connected with the opposite end of the lever 20, as indicated at 22. The lever is pivotally mounted between its ends on a suitable bracket 23 as indicated at 24 to swing in a vertical plane whereby the pin 17 is carried by it vertically toward and away from the fulcrum 16. The connection 22 between the lever 20 and the transmission rod 21 of the meter is a pivot similar to 24 and axially parallel therewith. The movable pivot pin 17 is also axially parallel with the pivots 22 and 24.

The transmission rod 21 is connected with the meter 19 in such a manner that it moves axially, that is, vertically up and down, in response to the indications of the meter and through the intermediary of the lever 20, causes the distance between the movable pin 17 and the pivot connection 16, as indicated at $y$, to vary correspondingly.

The vane 12 is thus under control of meters 5 and 7 through the fulcrum 16 and under control of meter 19 through the pivot pin 17. The vane is provided at its free end with an indicator 25 which moves over a suitably graduated scale 26 as the vane moves in response to the indications transmitted to it from the meters 5, 7, and 19.

For any deflection of the vane 12, for example from a certain position 27 to the position shown, the deflection of the indicator 25 or scale reading change may be expressed in terms of the movement $x$ of the fulcrum 16 which is caused by the joint action of the meters 5 and 7, and in terms of the distance $y$ between the fulcrum 16 and the pivot pin 17, which distance is varied in accordance with the indications of meter 19, in an equation as follows:

$$(3) \quad W = x\left(1 + \frac{c_1}{y}\right)$$

in which W is the deflection of the indicator 25, $x$ is the distance the fulcrum 16 moves for said deflection, $c_1$ is a constant, being the distance between the fulcrum 16 and the indicating tip of the indicator 25, and $y$ is the distance between the fulcrum 16 and the pivot pin 17 as before mentioned.

Since the distance $y$ is controlled by meter 19, whereby it varies correspondingly with the $CO_2$ content $k_n$, the factor $\left(1+\frac{c_1}{y}\right)$ thus corresponds to the factor $\left(W+\frac{c_1}{k_n}\right)$ of equation (2), $c_1$ being a constant in either case and $w$ being the water vapor content, the value of which is determined by the quality of the fuel and introduced into the reading of the scale by proper relation of the indicating parts. The distance $x$, as hereinbefore pointed out, is the sum of the indications of meters 5 and 7, that is, ($\Lambda t + c_2 k_2$) of equation (2). The scale reading W of equation (3) is therefore the indication of the flue gas loss V of equation (2).

The indicator 25 is thus made to move over the scale 26 in accordance with equation (2), and to provide a direct indication of the total flue gas loss V it is merely necessary to calibrate said scale in any desired units which express said loss. For example, the scale may be calibrated to read per cent B. t. u.'s loss per pound of fuel.

Referring now to Fig. 2 and the electrical means for carrying out the measurements in accordance with equation (2), this equation is modified to provide units which may be measured and correlated electrically in the particular embodiment shown. Assuming the temperature of the incoming air to be $t_o$ and the temperature of the flue gas to be $t_1$, then $(t_1 - t_o)$ may be substituted for $\Lambda t$. The loss in unburned material may be measured by the temperature increase resulting from the reburning, thus in place of $k_2$ the factor $(t_3 - t_2)$ may be substituted, in which $t_2$ is the temperature before reburning and $t_3$ the temperature after reburning the flue gas. Equation (2) then becomes:

$$(4) \quad V = (t_1 + c_2 t_3 - [t_0 c_2 t_2])\left(w + \frac{c_1}{k_n}\right).$$

The various factors of this equation may then be represented electrically in a circuit arrangement comprising suitable current controlling devices which operate in accordance with it. In the present example, the arrangement comprises a divided current-controlling or resistor circuit provided with terminal points 28, 29 and 30, which are connected with a suitable source of substantially constant voltage, such as supply mains indicated at 31 and 32. Circuit terminals 28 and 30 are connected with supply main 31, which may be considered to be the higher potential side of the supply source, through circuit wires 33 and 34 respectively, while terminal 29 is connected with the low potential main 32 through a circuit wire 35.

In circuit wires 33 and 34 are connected current limiting devices or ballast resistors 36 and 37 respectively, which operate to limit the current flow through them to a constant value. For this purpose they may be simple iron wire resistors.

Between circuit terminals 28 and 29, and forming one part of the divided circuit, are connected two series-connected current controlling devices or variable resistors 38 and 39, the resistance of which varies in accordance with the temperatures $t_1$ and $t_3$ respectively, the latter resistor being designed to take into consideration the constant $c_2$ whereby it varies in accordance with the factor $(c_2 t_3)$.

Between circuit terminals 30 and 29, and forming the other part of the divided circuit, are connected two other series-connected current controlling devices or variable resistors 40 and 41, the resistance of which varies in accordance with the temperatures $t_o$ and $t_2$ respectively, resistor 41 being proportioned, like resistor 39, to include the constant $c_2$ whereby it varies in accordance with the factor $(c_2 t_2)$.

Terminal 29 is the common terminal for both parts of the divided resistor circuit and the current flow through said circuit is from the outer terminals 28 and 30 to said common terminal 29. The voltage set up between terminals 28 and 29 and between terminals 29 and 30 thus corresponds to the resistances between them, that is, to the factors $(t_1 + c_2 t_3)$ and $(t_0 + c_2 t_2)$ respectively, and since the current flow is toward the center terminal 29, the voltage falls from 28 to 29 and increases from 29 to 30. Thus the terminal voltage between 28 and 30 corresponds to the first factor of equation (4), that is, to $$(t_1 + c_2 t_3 - [t_0 + c_2 t_2]).$$

The second factor $\left(W + \dfrac{c_1}{k_n}\right)$ of equation (4) is obtained through the medium of a voltage divider or potentiometer 42 having terminals 43 and 44 which are connected with the terminals 28 and 30 respectively of the divided resistor circuit whereby it receives at its terminals the voltage set up for the first factor of the equation.

A portion of the resistance of the potentiometer 42 between terminal 44 and a point 45 along its length represents and is proportional to the magnitude of W, the water vapor content of the fuel used. The length of this portion may be adjusted to represent any water vapor content as determined from a sample of the fuel.

The potentiometer is provided with a movable contact 46 which is movable between point 45 and terminal 43 in response to changes in the value of the $CO_2$ content of the flue gas, that portion of the resistance over which the contact 46 moves being proportioned so that between said contact and the point 45 a resistance will be included which is proportional to the $CO_2$ content, that is, to $\dfrac{c_1}{k_n}$.

The voltage set up between terminals 28 and 30 in accordance with the first factor of equation (4)

$$(t_1 + c_2 t_3 - [t_0 + c_2 t_2]),$$

as above described, is impressed upon the terminals 43 and 44 of the potentiometer 42 and is in turn in part impressed upon an indicating or recording device 47. This may be an indicating or recording voltmeter, for example, provided with a suitably calibrated scale, and is connected with the movable contact 46 and terminal 44 as indicated by the circuit wires 48 and 49.

The recording device then receives from the potentiometer 42 a part voltage in accordance with the value W and $\dfrac{c_1}{k_n}$, that is, in accordance with the remaining factor $\left(W + \dfrac{c_1}{k_n}\right)$ of equation (4). Since the voltage impressed upon the terminals 43 and 44 of the potentiometer is that set up in accordance with the first factor of the equation (4), the recording device then receives a voltage which corresponds to the total flue gas loss in accordance with equation (4), and when calibrated in suitable units indicates or records the value V which is the total flue gas loss. Thus the value for the total flue gas loss is, through electrical means, directly indicated without computation. It will be seen that since the movable contact 46 moves between the terminal 43 and the point 45, it always indicates a part voltage corresponding to the value W.

In the case where, as hereinbefore pointed out, the measurement of the unburned material $k_2$ is effected by reburning, the flue gas may with advantage be first conducted to the meter for measuring this factor and then to the $CO_2$ meter, whereby the latter measures the $CO_2$ content after reburning.

In accordance with the invention, as illustrated in connection with the embodiments shown, the component parts of the flue gas loss are correlated and accurately measured in their totality directly without computation in a suitable meter which may be placed in any convenient location, such as at the boiler whose flue gas losses are to be measured. It will be appreciated that the measurement of the flue gas losses by the means of the present invention is of material assistance in operating the boiler efficiently, since the losses are thereby continuously and directly indicated.

It will be seen from the embodiments herein described and illustrated that in accordance with the invention direct and accurate measurement of flue gas losses in a boiler plant may be effected through simple and effective means, but it should be understood that the invention is not limited to the particular embodiments shown and may be carried out by other means.

What I claim as new and desire to secure by Letters Patent of the United States is:—

1. In a device for measuring flue gas losses, the combination with an indicating means, of means responsive to the changes in the temperature difference between air supporting combustion and flue gas resulting from said combustion, means responsive to changes in the unburned material content of said flue gas, said means being jointly connected with the indicating means to actuate the same, and means responsive to changes in the $CO_2$ content of the reburned flue gas interposed in said connection with the indicating means for modifying the indications thereof in accordance with said changes.

2. In a flue gas loss measuring device, the combination of a meter for measuring the $CO_2$ content of the reburned flue gas, a temperature-responsive device for measuring the temperature difference between the entering air for the combustion and the flue gas, a meter for measuring the unburned material content of the flue gas, a measuring device for the flue gas loss, means connecting said device with the temperature-responsive device and last-named meter whereby their combined indications are transmitted to it, and means connecting the $CO_2$ meter with said flue gas loss measuring device which transmits to said device the reciprocal of the measured value of the $CO_2$ content of the flue gas.

3. In a flue gas loss measuring device, the combination of a meter for measuring the unburned material in the flue gas, a temperature-responsive device for measuring the temperature difference between the entering air and the flue gas, a floating lever connected with said meter and said device whereby it is moved by their joint indications, an indicating pointer having a fulcrum point between its ends and a longitudinally movable pivot adjacent one end, a rod connecting the floating lever with the fulcrum whereby the joint indication of the meter and device are transmitted to said fulcrum, a $CO_2$ meter connected with said movable pivot, said pivot being carried toward and away from the fulcrum by the operation of the $CO_2$ meter, an indicator carried by the pointer and a scale over which the indicator moves.

In witness whereof, I have hereunto set my hand this 22nd day of January, 1925.

THEODOR STEIN.